United States Patent
Hijikata et al.

(10) Patent No.: US 7,802,421 B2
(45) Date of Patent: Sep. 28, 2010

(54) PM GENERATING APPARATUS

(75) Inventors: Toshihiko Hijikata, Nagoya (JP); Satoru Yamada, Nagoya (JP); Yukio Miyairi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 989 days.

(21) Appl. No.: 11/598,087

(22) Filed: Nov. 13, 2006

(65) Prior Publication Data

US 2007/0111150 A1    May 17, 2007

(30) Foreign Application Priority Data

Nov. 14, 2005    (JP)    ............................. 2005-329108

(51) Int. Cl.
 *F01N 3/00*    (2006.01)
(52) U.S. Cl. ................... 60/288; 60/277; 73/114.75; 73/118.01; 431/8; 431/9; 431/173; 431/278
(58) Field of Classification Search ............ 431/5, 431/8–9, 173, 350–355, 275; 60/722, 748; 110/212–216; 73/114.75, 118.01
See application file for complete search history.

(56) References Cited

U.S. PATENT DOCUMENTS

| | | |
|---|---|---|
| 2,628,674 A | 2/1953 | Fore |
| 2,780,529 A | 2/1957 | Wrigley |
| 2,877,717 A | 3/1959 | Reed |
| 3,048,215 A | 8/1962 | Huckabee |
| 3,443,761 A | 5/1969 | De Groot |
| 3,922,335 A | 11/1975 | Jordan et al. |
| 3,957,446 A * | 5/1976 | Mayer et al. ................. 422/168 |
| 4,228,131 A | 10/1980 | Rothbühr et al. |
| 4,240,784 A * | 12/1980 | Dauvergne ................... 431/351 |
| 4,608,013 A * | 8/1986 | Gaysert et al. ................. 431/1 |
| 4,879,959 A * | 11/1989 | Korenberg ................... 110/264 |
| 5,766,000 A | 6/1998 | Thompson |
| 7,140,874 B2 * | 11/2006 | Ingalls et al. ................ 431/185 |
| 2004/0096794 A1 * | 5/2004 | Lovgren et al. .............. 431/353 |
| 2004/0200212 A1 * | 10/2004 | Katogi et al. .................. 60/290 |
| 2004/0226352 A1 | 11/2004 | Craig et al. |
| 2005/0048430 A1 * | 3/2005 | Steiner ........................ 431/278 |

FOREIGN PATENT DOCUMENTS

| | | |
|---|---|---|
| JP | A 10-318888 | 12/1998 |
| JP | A 10-319006 | 12/1998 |
| JP | A 2005-214742 | 8/2005 |

* cited by examiner

*Primary Examiner*—Thomas E Denion
*Assistant Examiner*—Jesse Bogue
(74) *Attorney, Agent, or Firm*—Oliff & Berridge, PLC

(57) ABSTRACT

A means capable of supplying exhaust gas sufficiently imitating exhaust gas from actual diesel engines is provided. A PM generating apparatus has a constitution in which combustion air supplied to the space between a chassis and an outer casing via an air inlet is introduced into the space between the outer casing and an inner casing via through-holes of the outer casing, and a fuel injected by an fuel-injection means into the space between the chassis and the outer casing is introduced into the space between the outer casing and the inner casing via the through-holes of the outer casing, wherein the fuel is combusted to generate PM.

28 Claims, 6 Drawing Sheets

PM GENERATING APPARATUS

BACKGROUND OF THE INVENTION

1. Field of the Invention

The invention relates to a PM generating apparatus for generating particulate matter (PM) in a gas in order to evaluate an exhaust gas purifying apparatus equipped with DPF, a catalyst, and the like.

2. Background Art

Particulate matter (PM) and toxic substances contained in exhaust gas from various internal combustion engines have a significant effect on human bodies and the environment. The need for preventing emission of particulate matter and toxic substances to the atmosphere is increasing. In particular, the effects of PM and $NO_x$ (nitrogen oxide) discharged from diesel engines are serious and regulations prohibiting their emission are reinforced worldwide. For this reason, exhaust gas purifying apparatus equipped with a diesel particulate filter (DPF) for removing PM or a catalyst useful for reducing $NO_x$ to nitrogen and water have been investigated and developed. Some high performance exhaust gas purifying apparatus have been introduced into the market.

However, no means for testing the exhaust gas purifying apparatus and accurately and correctly evaluating the performance and durability of such a exhaust gas purifying apparatus has been proposed until now. There are few prior art documents. Although some prior art technologies relating to an evaluation gas feeder (Patent Document 1), a vapor gas feeder (Patent Document 2), and a gas analyzer (Patent Document 3) are known, these technologies have problems such as incapability of adequately imitating actual exhaust gas (see Patent Document 1) and unavailability of a specific means for generating exhaust gas (see Patent Documents 2 and 3).

The prior art technologies are now described. As a means to evaluate the performance and the like of an exhaust gas purifying apparatus, a method of supplying exhaust gas from an actual diesel engine to an exhaust gas purifying apparatus and analyzing the gas processed by the exhaust gas purifying apparatus can be given. A method of carbon powder or PM extracted from actual exhaust gas in a gas phase to produce an imitation exhaust gas imitating the exhaust gas from an actual diesel engine and the like, feeding that gas to an exhaust gas purifying apparatus, and analyzing the gas processed by the exhaust gas purifying apparatus is also known (see Patent Document 1). In addition, a method of generating exhaust gas containing PM by burning gas oil or hydrocarbons and a method of generating exhaust gas containing PM by causing a graphite electrode to spark are also known. It is possible to evaluate the performance and the like of an exhaust gas purifying apparatus using such an exhaust gas (see Patent Document 1).

(Patent Document 1) JP-A-2005-214742
(Patent document 2) JP-A-10-318888
(Patent document 3) JP-A-10-319006

SUMMARY OF THE INVENTION

However, in the method of using exhaust gas from actual diesel engines and the like, the flow rate of exhaust gas, the amount of PM produced, exhaust gas temperature, and the amount of SOF cannot be independently controlled. Therefore, it was impossible to evaluate the performance of an exhaust gas purifying apparatus under fixed conditions. In the method of producing exhaust gas imitating exhaust gas from a diesel engine and the like (see Patent Document 1), on the other hand, the fuel used for producing the imitation gas may differ from actually used fuel. In addition, the obtained exhaust gas may not sufficiently imitate actual exhaust gas as mentioned above, because collected PM is used. In addition, in the method of generating exhaust gas containing PM by burning gas oil or hydrocarbons, properties of PM, particularly properties of particle size distribution of PM, differ from those of exhaust gas from an actual diesel engine and the like. The PM-containing gas cannot be a gas imitating actual exhaust gas and is not suitable for evaluating performance and the like of an exhaust gas purifying apparatus. In this manner, all prior art technologies have some problems in the means for generating exhaust gas for evaluation to be supplied to an exhaust gas purifying apparatus.

The present invention has been achieved in view of this situation and has an object of providing a means capable of supplying exhaust gas adequately imitating an exhaust gas from actual diesel engines and the like for evaluation of an exhaust gas purifying apparatus in a safe manner under died conditions. The inventors have conducted extensive studies from the above point of view and found that the above objects can be achieved by the following means.

According to the present invention, there is provided an apparatus for generating PM (particulate matter) in a gas by mixing a liquid and/or gaseous fuel with combustion air and incompletely burning the mire, comprising: a combustion chamber in which fuels are mixed with combustion air and combusted, a fuel-injection means to inject the fuel to the combustion chamber, and a pilot burner which ignites the air-fuel mixture; the combustion chamber comprising a chassis equipped with an air inlet for supplying combustion air, a gas outlet for discharging the gas in which PM was generated, and the flame entrance leading to a pilot burner, an outer casing incorporated in the chassis, while forming a space between itself and the chassis, and an inner casing incorporated in the outer casing so as to be directly connected to a flame entrance, while forming a space between itself and the outer casing; the outer casing and inner casing being provided with through-holes around the circumference thereof so that the fuel injected by the fuel-injection means into the space between the chassis and the outer casing and the combustion air supplied to the space between the chassis and the outer casing from the air inlet are introduced into the space between the outer casing and the inner casing through the through-holes of the outer casing and mixed there. The PM generating apparatus of the present invention is an apparatus for generating PM in a gas, that is, an apparatus which produces and applies a gas in which PM is generated (PM-containing gas). Soot and SOF are included in the PM (particulate matter).

In the PM generating apparatus of the present invention, it is preferable that the fuel-injection means intermittently inject a fuel into the space between the chassis and the outer casing.

In the PM generating apparatus of the present invention, the chassis has a cylindrical area and each of the outer casing and the inner casing has the shape of a cylinder. The cylindrical outer casing is preferably incorporated in the cylindrical area of the chassis so that cylindrical outer casing becomes coaxial with the cylindrical area of the chassis. The cylindrical inner casing is preferably incorporated in the cylindrical outer casing so that its axis has the same direction as, but is eccentric to the central axis direction of the cylindrical outer casing. Preferred embodiments of the present invention will now be described in more detail.

The PM generating apparatus of the present invention is preferably provided with a front plate which is incorporated in the chassis, is equipped with an opening leading to a gas outlet, and forms the end face on the gas outlet side, and a back plate which is incorporated in the chassis, is equipped with an opening leading to a flame entrance, and forms the end face of the flame entrance side. The front plate and the outer casing are preferably integrally formed and/or the back plate and the inner casing part are preferably integrally formed. In addition, the outer casing, the inner casing, the front plate, and the back plate are preferably formed from a metallic material. The metallic material is preferably "Inconel". In this manner, the operation of mixing a fuel with combustion air and incompletely burning the fuel to generate PM in the gas is carried out in the space surrounded by the "Inconel" material.

The outer casing, the inner casing, the front plate, and the back plate are also preferably formed from a ceramic material. The ceramic material is preferably at least one kind selected from the group consisting of silicon nitride, silicon carbide, zirconia, zirconium phosphate, aluminium titanate, titania, and combination thereof. In this case, durability of the apparatus is more improved than that formed from a metallic material. Further, since the ceramic material is difficult to thermally transform compared with the metallic material, a lowering of PM generation amount due to thermal transformation of the material is prevented. The ceramic material is more preferably silicon nitride.

In the PM generating apparatus of the present invention, the fuel-injection means is preferably installed in the chassis so that the fuel injection direction is approximately at right-angles to the central axis direction of the outer casing and inclines to the tangential direction of the cross-section perpendicular to the central axis direction of the outer casing. The fuel-injection means is preferably formed so that the fuel injected by the fuel-injection means in the space between the chassis and the outer casing is introduced to the space between the outer casing and the inner casing through through-holes in the outer casing, while running around the circumference of the outer casing. "Approximately at right-angles" means that the angle is preferably a right angle but may not necessarily be strictly 90°. The injection direction of a fuel of between 85° to 95° to the center axis direction of the outer casing is allowable. The direction in which the fuel runs and the manner of installing the fuel-injection means in the chassis for ensuring the fuel-running direction selected are not limited as long as the above-mentioned requirements are met.

The constitution in which the air inlet is provided near the fuel-injection means of the chassis and the combustion air supplied to the space between the chassis and the outer casing from the air inlet is introduced along with the fuel into the space between the outer casing and the inner casing through the through-holes of the outer casing, while running around the circumference of the outer casing, is preferable.

In the PM generating apparatus of the present invention, a part or all of the through-holes provided in the outer casing part preferably inclined to the tangential direction of a cross-section perpendicular to the central axis direction of the outer casing (direction of the circumference of the outer casing). Since the through-hole inclines, elliptical openings are formed on the surface of the outer casing.

In the case in which axes of coordinates consisting of an X-axis and a Y-axis crossing at the central axis of the cylindrical area of the chassis at right angles to each other are set on a cross-section perpendicular to the central axis direction of the cylindrical area of the chassis (provided that the absolute directions of the X-axis and Y-axis are not limited so long as the X-axis and Y-axis mutually maintain a right angle on a cross-section perpendicular to the central axis direction), the PM generating apparatus of the present invention is preferably provided with a fuel-injection means in the chassis in such a manner that the fuel injection direction is parallel to the X-axis at a position of $Y=+60$ to $+80$, when the wall of the cylindrical area of the chassis is located at $Y=+100$. Because the outer casing is coaxial with the cylindrical area of the chassis, the axes of coordinates are set on the cross-section perpendicular to the central axial direction of the outer casing.

This requirement specifies the location of the fuel-injection means. Since the axes of coordinates are set up so that they cross at the central axis perpendicular to the central axis direction of the cylindrical area of the chassis, the wall of the cylindrical area of the chassis crosses the Y-axis at two points, one on the +Y side and the other on the −Y side, and the X-axis at two points, one on the +X side and the other on the −X side. The term "when the wall of the cylindrical area of the chassis is located at $Y=+100$" indicates the case in which the wall of the cylindrical area of the chassis crosses the Y-axis on the +Y side. The location of the fuel-injection means on axes of coordinates, the location of at least one through-hole among two or more through-holes mentioned later, and the direction in which the central axis of the inner casing deflects from the central axis of the outer casing are specified by the magnitude and polarity of Y. As to the location of the chassis in the central axis direction, the fuel-injection means is preferably located at a distance of 20 to 80 from the flame entrance side, provided that the length of the outer casing in the chassis in the central axis direction is 100.

In the PM generating apparatus of the present invention, it is preferable that at least one of the two or more through-holes provided around the circumference of the outer casing be located at a position of $Y=+70$ to 90 (when the wall of the cylindrical area of the chassis is located at a position of $Y=+100$).

In addition, it is preferable that the angle formed by at least one of the two or more through-holes provided around the circumference of the outer casing, the origin of the axes of coordinates, and the fuel-injection means be 10 to 40°. This angle is, in other words, the angle formed by the line connecting at least one of the two or more through-holes, the origin of the above axes of coordinates, and the fuel-injection means. Because the through-holes and fuel-injection means have a predetermined width, the angle is determined by the lines connecting the center of the through-hole, the origin of the coordinate axes, and the point at which the fuel is injected from the fuel-injection means. This preferable embodiment shows that at least one of the two or more through-holes provided around the circumference of the outer casing is installed at a position neither too close to nor too far from the fuel-injection means. In the PM generating apparatus of the present invention, it is preferable that after specifying the location of one of the two or more through-holes according to the above conditions, the other through-holes be arranged evenly around the circumference of the outer casing. Because the cross-section perpendicular to the central axis direction of the cylindrical outer casing is in a form of a round loop (form of a doughnut), an embodiment in which about 3 to 8 through-holes are provided at equal intervals around the circumference of the loop, in other words, the central angle is about 45° to 120°, is given, for example.

In addition, the outer casing and the inner casing are preferably eccentrically located by deflection of the central axis of the inner cylinder to the −Y side from the central axis of the outer casing. This means that because the fuel-injection means is arranged on the +Y side, the outer casing and the inner casing are eccentrically located on the other side (of the coordinate axis) of the fuel-injection mean.

In the PM generating apparatus of the present invention, the ratio of the total length of the outer casing, front plate, and back plate in the central axis direction to the inside length of the cylindrical area of the chassis in the central axis direction is preferably 70:100 to 98:100.

Furthermore, it is preferable that the PM generating apparatus of the present invention have a non-expanding ceramic fibrous mat inserted between the back plate and the chassis.

In the PM generating apparatus of the present invention, the ratio of the diameter of the through-holes arranged around the circumference of the outer casing to the inner diameter of the outer casing is preferably 5:100 to 20:100, and more preferably 7:100 to 15:100. Specifically, when the inner diameter of the outer casing part is 100%, the diameter of the through-holes arranged around the circumference of the outer casing is preferably 5 to 20%, and more preferably 7 to 15%.

In the PM generating apparatus of the present invention, the ratio of the diameter of the outlet of the gas in which PM was generated formed in the chassis to the inner diameter of the outer casing is preferably 10:100 to 50:100. Specifically, when the inner diameter of the outer casing is 100, the diameter of the outlet of the chassis is 10 to 50. More preferably, the ratio of the diameter of the chassis outlet to the inner diameter of the outer casing is 10:100 to 3:100.

The invention has been described taking an embodiment in which the chassis of the PM generating apparatus has a cylindrical area and each of the outer casing and the inner casing has a shape of a cylinder, the cylindrical outer casing is incorporated in the cylindrical area of the chassis so that cylindrical outer casing become coaxial with the cylindrical area of the chassis, the cylindrical inner casing is incorporated in the cylindrical outer casing so that its axis has the same direction as, but is eccentric to the central axis direction of the cylindrical outer casing. However, the present invention is not limited to this more preferable embodiment.

In the PM generating apparatus of the present invention, the volume (liter) inside the outer casing of the combustion chamber is preferably 1.2 or more times, more preferably 1.5 or more times, but not more than 4 times, of the flow rate ($Nm^3/min$) of the maximum amount of the combustion air supplied. For example, when the flow rate of the maximum amount of the combustion air supplied (used) is 0.5 $Nm^3/min$, the volume of the combustion chamber is preferably 0.61 or more, and more preferably 0.751 or more. Since 1 $m^3$ is 1,000 l under the atmospheric pressure, this requirement indicates that the inside volume (l) of the outer casing of the combustion chamber is preferably $1.2 \times 10^{-3}$ times or more of the maximum amount of the combustion air (NI) supplied per minute.

In the PM generating apparatus of the present invention, the inner diameter (mm) of the outer casing of the combustion chamber preferably satisfies the conditions that the quotient obtained by dividing the square of the inner diameter (mm) of the outer casing by the maximum flow rate ($Nm^3/min$) of the greatest amount of combustion air supplied is preferably $2.0 \times 10^4$ or more, and more preferably, $2.3 \times 10^4$ or more, but not more than $5.0 \times 10^4$. For example, when the flow rate of the maximum amount of the combustion air supplied (used) is 0.5 $Nm^3/min$, the inner diameter of the combustion chamber is preferably 100 mm or more, and more preferably 107 mm or more.

The fuel injection pressure of the PM generating apparatus is preferably 0.1 to 1.0 MPa.

In the PM generating apparatus of the present invention, when the fuel is gas oil, the amount of PM generated in the gas can be 0.1 to 30 g/l (gas oil). The amount of SOF (soluble organic fraction:components soluble in an organic solvent) of the PM can be 1 to 50 mass %, and the average particle diameter of the PM can be 10 to $150 \times 10^{-9}$ m. The PM generating apparatus of the present invention can be preferably applied in the situation requiring such performance.

The PM generating apparatus may have two or more fuel injection means in one combustion chamber. Such an embodiment is preferable.

In addition, the PM generating apparatus of the present invention may be equipped with two or more combustion chambers, fuel injection means, and pilot burners. Such an embodiment is also preferable.

The destination to which the gas in which PM is generated is sent is an exhaust gas ping apparatus, wherein the gas is suitably used for evaluating the exhaust gas purifying apparatus. In addition, when the exhaust gas purifying apparatus is equipped with a DPF (diesel particulate filter) and the target of evaluation is one or more of the DPF collection efficiency, PM deposition pressure loss, reproduction performance, and oxidation performance, the PM generating apparatus can be used suitably. Evaluation of durability of an exhaust gas purifying apparatus is also included in the object of evaluation. An exhaust gas purifying apparatus equipped with a catalyst which decomposes toxic substances in exhaust gas is also included in the exhaust gas purifying apparatus to be evaluated. Supplying NO (nitrogen monoxide) and the like to the PM generating apparatus from an outside source in order to evaluate the oxidation performance of a catalyst is also a preferable means.

Next, according to the present invention, an apparatus for evaluating an exhaust gas purifying apparatus by supplying a mixed PM-containing gas to the exhaust gas purifying apparatus, comprising two or more PM generating apparatuses of any type mentioned above, a controlling means which can operate the two or more PM generating apparatuses under the same conditions or at least one PM generating apparatus under conditions differing from the conditions under which the other PM generating apparatuses are operated, and a PM-containing gas-mixing means to mix gases in which PM produced in different PM generating apparatuses has been generated to obtain a mixed PM-containing gas is provided. Furthermore, a PM generating apparatus that has a capacity for producing from a small amount to a large amount of exhaust gas can be obtained by changing the volume of the combustion chamber of the two or more PM generating apparatuses.

In the PM generating apparatus of the present invention, a combustion chamber has a chassis, an outer casing incorporated in the chassis, and an inner casing incorporated in the outer wrings the outer casing and inner casing have through-holes around their surfaces. The PM generating apparatus is formed so that the fuel injected by the fuel-injection means in the space between the chassis and the outer casing and the combustion air supplied to the space between the chassis and the outer casing from an air inlet are introduced to the space between the outer casing and the inner casing via through-holes of the outer casing to be mixed there. Therefore, when a prescribed amount of combustion air is continuously supplied to the space between the chassis and outer casing, and a fuel is injected (preferably intermittently) into the same space by the fuel-injection means, a fuel-air mixture with a high fuel concentration which is heated and vaporized in the outer casing is introduced into the space between the outer casing and inner casing via the through-hole of the outer casing, the area of the fuel-air mixture being in contact with the air is combusted, while the fuel-air mixture in the inner side shut off from the air is roasted by the heat of combustion, thereby producing PM. Specifically, PM can be generated by approximately the same mechanism as the PM generated from a diesel engine using the PM generating apparatus of the present invention, and the resulting PM-containing gas is approximately the same as exhaust gas from an actual diesel engine. Therefore, the PM-containing gas produced by PM generating apparatus of the present invention is suitable for evaluating performance and the like of exhaust gas purifying apparatus. In addition, because a greater amount of PM can be produced from a given amount of gas oil than the amount of PM produced by an actual diesel engine, the PM generating apparatus of the present invention excels in efficiency. Because vaporization of a fuel is insufficient if the fuel is incompletely combusted using a burner with conventional fuel injection equipment, the distribution of particle size of PM (the particle size of soot mainly contained in PM) is broader than that from an actual diesel engine or production of PM-containing gas with stable properties is impossible due to an increase of SOF. These problems can be solved using the PM generating apparatus of the present invention.

In a preferred embodiment of the PM generating apparatus of the present invention, the fuel-injection means is installed in the chassis so that the fuel injection direction may be approximately right-angled to the central anus direction of the outer casing and may incline to the tangential direction of the section perpendicular to the central axis direction of the outer casing, and an air inlet is provided near the fuel-injection means of the chassis so that the fuel injected by the fuel-injection means in the space between the chassis and the outer casing and the combustion air may be introduced to the space between the outer casing and the inner casing via through-holes of the outer casing, while running around the circumference of the outer casing. Therefore, the inside of the outer casing and chassis is cooled by evaporation of the combustion air and fuel, whereby an excess increase of the temperature is prevented. For this reason, durability of the chassis and outer casing of the combustion chamber is remarkably improved. In the burner with conventional fuel injection equipment, combustion flame directly comes in contact with the inner side of the chassis and excessively heats the chassis, giving rise to poor durability. Such a problem does not occur in the present invention.

In a preferred embodiment of the PM generating apparatus of the present invention, a part or all of the through-holes provided in the outer casing is formed inclined to the tangential direction of a section perpendicular to the central axis direction of the outer casing (direction of the circumference of the outer casing) and elliptical openings are formed on the surface of the outer casing, which ensures smooth and stable introduction of fuel to the space between the outer casing and inner casing. This construction ensues controlled mixing of fuel and combustion air and maintains a high fuel concentration in part of the fuel-air mixture, causing the introduced fuel to become roasted. In this manner, a great amount of black and stabilized PM with a small SOF content can be produced. If the through-holes provided in the outer casing do not incline and round openings are formed on the surface of the outer casing, the injected fuel cannot be smoothly introduced in the space between the outer casing and the inner casing, but the fuel circulates around the space between the chassis and the outer casing and mixed with the combustion air, thereby decreasing the fuel concentration. For this reason, brown PM with a large SOF content is produced only in a small amount. Such a problem does not occur in the present invention.

In addition, since the outer casing and the inner casing are eccentrically installed on the opposite side of the fuel-injection means in a preferred embodiment of the PM generating apparatus of the present invention, the space between the outer casing and the inner casing is narrow on the side on which they are eccentric each other. Therefore, the speed at which the fuel and combustion air introduced into the space between the outer casing and inner casing from the through-holes of the outer casing near the fuel injection equipment runs around the inner casing and the speed at which the fuel and combustion air introduced into the space between the outer casing and inner casing from the through-holes of the outer casing remote from the fuel injection equipment runs around the inner casing are approximately the same, thereby ensuring controlled mixing of the fuel and combustion air and maintaining a high fuel concentration in part of the fuel-air mixture. In this manner, a large amount of black and stabilized PM with a small SOF content can be produced.

In a preferred embodiment of the PM generating apparatus of the present invention, in the case in which axes of coordinates consisting of X-axis and Y-axis crossing at right angle are set on a section perpendicular to the central axis direction of the cylindrical area of the chassis passing at the central axis, at least one of the through-holes provided on the circumference of the outer casing is provided at a position of $Y=+70$ to $+90$, when the wall of the cylindrical area of the chassis is located at $Y=+100$, and the positional relationship of the through holes and the fuel-injection means is such that the angle formed by at least one of the through-holes provided around the circumference of the outer casing, the origin of the axes of coordinates, and the fuel-injection means may be 10 to 40°. This construction ensues smooth collision of fuel and combustion air against the circumference of the outer casing. In addition, since the distance between the fuel injection equipment and the through-holes is moderately short, the mixture of the fuel and combustion air with a high fuel concentration is introduced into the inside of the outer casing from the outer casing through-holes. In this manner, a large amount of black and stabilized PM with a small SOF content can be produced. If the above-mentioned angle is greater than 40°, the fuel and combustion air violently collide the circumference of the outer casing and the through-holes also go away from the fuel injection equipment, causing easier mixing of the fuel with the combustion air, whereby brown PM with a large SOP content tends to be produced only in a small amount. The amount of PM generated tends to be reduced. If the above-mentioned angle is smaller than 10° and through-holes are too close to the fuel injection equipment, the fuel is introduced and combusted before vaporization, resulting in a wide particle size distribution and a large particle size of PM. The PM-containing gas produced differs from exhaust gas from a diesel engine and the like.

In a preferred embodiment of the PM generating apparatus of the present invention, the volume (liter) inside the outer casing of the combustion chamber is 1.2 to 1.5 times of the flow rate ($Nm^3$/min) of the maximum amount of the combustion air supplied. The volume is sufficiently large for the flow rate of the maximum amount of the combustion air used. In addition, the inner diameter (mm) of the outer casing of the combustion chamber satisfies the conditions that the quotient obtained by dividing a square of the inner diameter (mm) of the combustion chamber by the maximum flow rate ($Nm^3$/min) of the greatest combustion air supplied is $2.0 \times 10^4$ to $2.3 \times 10^4$ or more, and in addition, the ratio of the diameter of the through-holes provided on the circumference of the outer casing to the inner diameter of the outer casing is 5:100 to 20:100, more preferably 7:100 to 15:100, so that the flow rate in each section may be sufficiently small. Therefore, mixture of a fuel with combustion air is inhibited, whereby a part of the mixture has a high fuel concentration. Thus, the fuel in such a fuel-air mixture is roasted, resulting in production of a large amount of black and stabilized PM with a small SOF content. If the volume of the combustion chamber is less than 1.2, the flow rate is too high and a fuel easily mixes with combustion air, resulting in a low fuel concentration. Therefore, brown PM with a large SOF content is produced only in a small amount. Such a problem does not occur according to the present invention.

Specifically, in the PM generating apparatus of the present invention, a combustion chamber has a chassis, an outer case incorporated in the chassis, and an inner case incorporated in the outer case, the outer case and inner casing have through-holes around their surfaces, and a fuel injected by the fuel-injection means in the space between the chassis and the outer case and combustion air supplied to the space between the chassis and the outer case from an air inlet are introduced to the space between the outer case and the inner case via through-holes of the outer casing. Such a structure is suitable for making a fuel-air mixture with an uneven fuel concentration in a range in which the amount of combustion airs is large as compared with the size of the combustion chamber (a range in which the volume inside the outer casing (l) is sufficiently large for the flow rate of the maximum combustion air used).

In a preferred embodiment of the PM generating apparatus of the present invention, since the ratio of the diameter of the gas outlet of the chassis to the inner diameter of the outer casing is 10:100 to 50:100, so that the diameter of the gas outlet of the chassis may be sufficiently small, a pressure is applied to the combustion chamber and almost all combustion occurs in the combustion chamber with a small flow rate. This construction ensures controlled mixing of the fuel and combustion air and a high fuel concentration of the fuel-air mixture, causing the fuel in that fuel-air mixture to become roasted. In this manner, a great amount of black and stabilized PM with a small SOF content can be produced. When the ratio of the diameter of the gas outlet of the chassis to the inner diameter of the outer casing is outside the above range and the diameter of the gas outlet of the chassis is greater than 50, the pressure applied to the combustion chamber is sufficiently low to cause combustion outside the combustion chamber, while allowing the fuel to mix with the combustion air to reduce the fuel concentration. Therefore, brown PM with a large SOF content tends to be produced only in a small amount. Such a problem does not occur according to the present invention.

In a preferred embodiment of the PM generating apparatus, the fuel injection pressure of is high and the pressure range is broad, i.e. from 0.1 to 1.0 MPa. When a high pressure is set up by intermittent injection, since a fuel with the same flow rate can be injected in a short time, the fuel-air mixture contains the fuel at a higher concentration. Therefore, it is possible to generate a larger amount of PM. In addition, since it is possible to control the amount of PM generated in a wide range and to freely control the color of PM and the amount of SOF by variously changing the pressure, the PM generating apparatus is an ideal means for correctly and accurately evaluating the performance and durability of exhaust gas purifying apparatus.

When the flow rate of the gas in which the target PM has been generated is small, that is, when the flow rate of the fuel and combustion air in the PM generating apparatus is small, the temperature of the combustion chamber does not sufficiently increase during combustion, resulting in production of brown PM, a large amount of SOF, and a reduced amount of the PM. However, according to the preferred embodiment of the PM generating apparatus of the preset invention provided with two or more combustion chambers, fuel injection means, and pilot burners, a specification conforming to the flow rate can be realized. Thus, the PM generating apparatus can be operated at various flow rates. Furthermore, a PM generating apparatus having a capacity for producing from a small amount to large amount of exhaust gas can be obtained by providing combustion chambers with different volumes, i.e. by changing the volume of at least one of the combustion chambers.

Since the PM generating apparatus of the present invention does not use an exhaust gas from an actual diesel engine and the like, the equipment can be downsized and cost can be suppressed. In addition, the flow rate of exhaust gas, the amount of PM produced, the temperature of exhaust gas, and the amount of SOP cannot be independently controlled in an actual diesel engine. However, according to the PM generating apparatus of the present invention, these factors can be independently controlled and can supply exhaust gas adequately imitating an exhaust gas from actual diesel engines and the like to exhaust gas purifying apparatus under fixed conditions. The PM generating apparatus is thus more excellent means. Therefore, the PM generating apparatus is suitable as a means for generating and supplying exhaust gas for evaluation to be supplied to an exhaust gas purifying apparatus.

When the flow rate of the gas in which the target PM has been generated is small, that is, when the flow rate of the fuel and combustion air in the PM generating apparatus is small, the temperature of the combustion chamber does not sufficiently increase, resulting in production of brown PM, a large amount of SOF, and a reduced amount of the PM. However, the evaluation apparatus of an exhaust gas purifying apparatus of the present invention in which two or more PM generating apparatuses are installed can overcome such problems and can process from a small amount to large amount of gas in which PM has been generated. Furthermore, it is possible to process from a small amount to large amount of gas by installing combustion chambers with different volumes, i.e. by changing the volume of at least one of the combustion chambers, in two or more PM generating apparatuses. Therefore, the evaluation apparatus of the present invention is suitable as a means for accurately and correctly evaluating the performance and durability of exhaust gas purifying apparatus having various capacities.

DETAILED DESCRIPTION OF THE INVENTION AND PREFERRED EMBODIMENT

Figure 1:
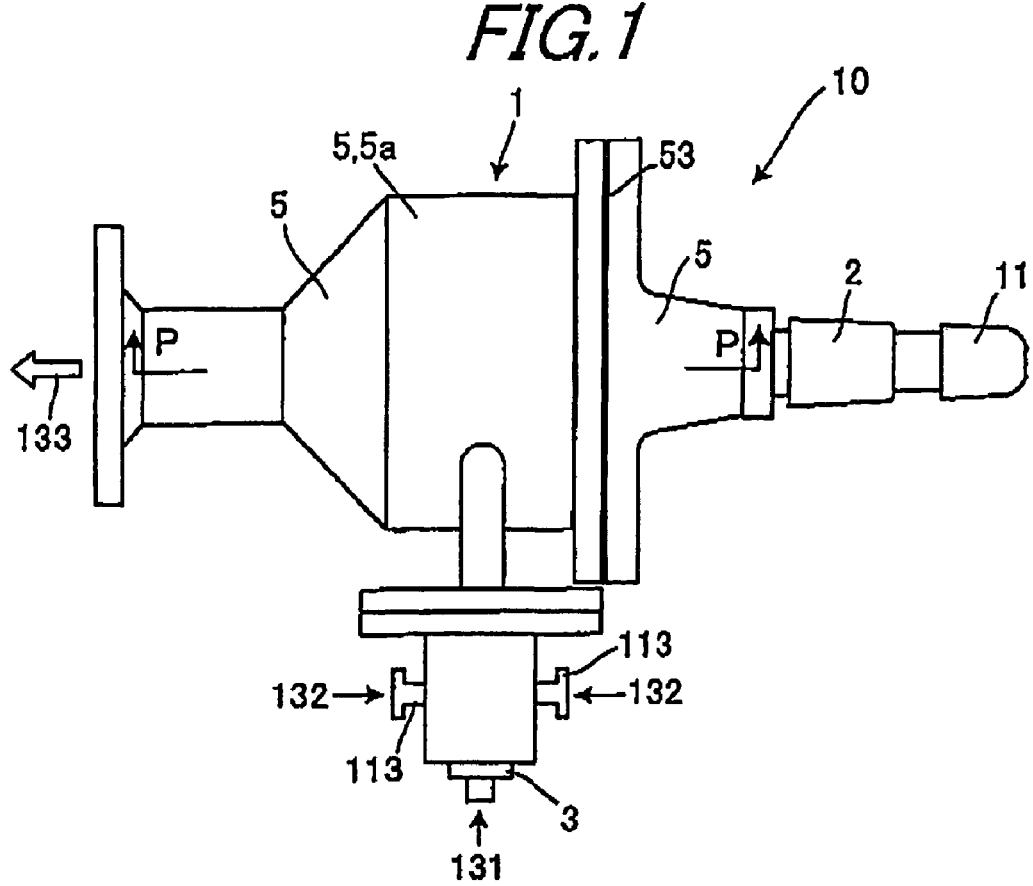
FIG. 1 is a top view showing one embodiment of the PM generating apparatus of the present invention.

Embodiments of the present invention are described below with reference to the drawings. The following descriptions, however, should not be construed to limit the present invention to these embodiments. Various alterations, modifications, improvements, and substitution are possible by persons skilled in the art to the extent that the substance of the present invention is not altered. For example, although the drawings represent preferred embodiments of the present invention, the present invention is not limited to the embodiments illustrated in the drawings or the information provided in the drawings. Although the present invention may be practiced or verified by applying a means similar to or equivalent to the means described herein, a preferred means is the means described herein.

Figure 2:
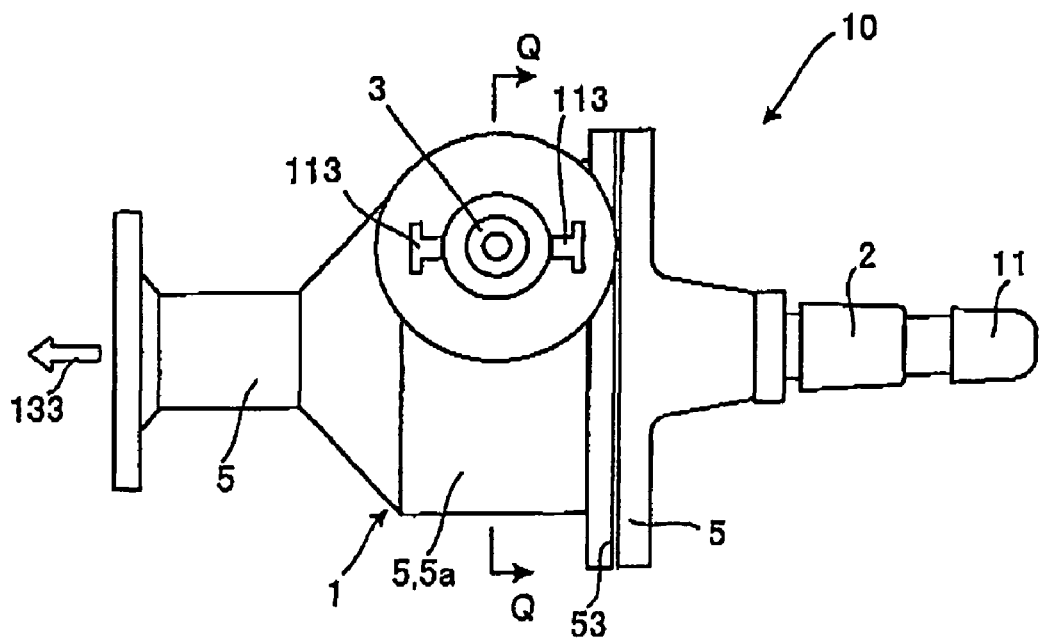
FIG. 2 is a side elevational view of the PM generating apparatus shown in FIG. 1.
Figure 3:
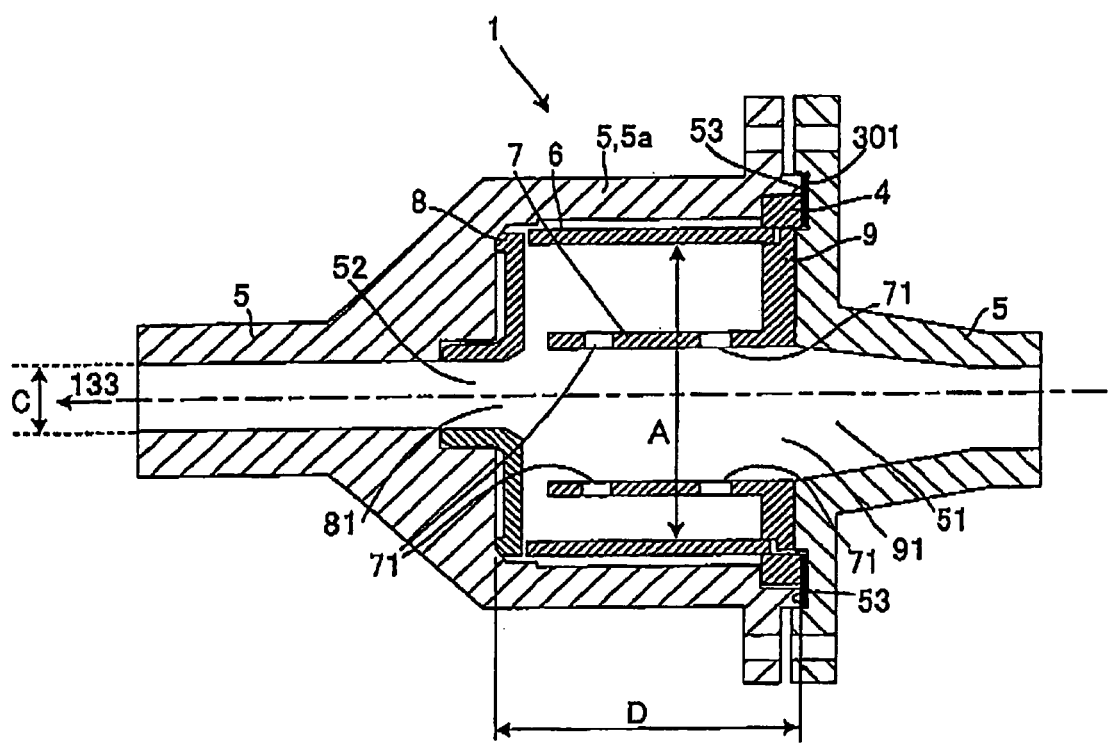
FIG. 3 is a cross-sectional view along a PP cross-section of FIG. 1.
Figure 4:
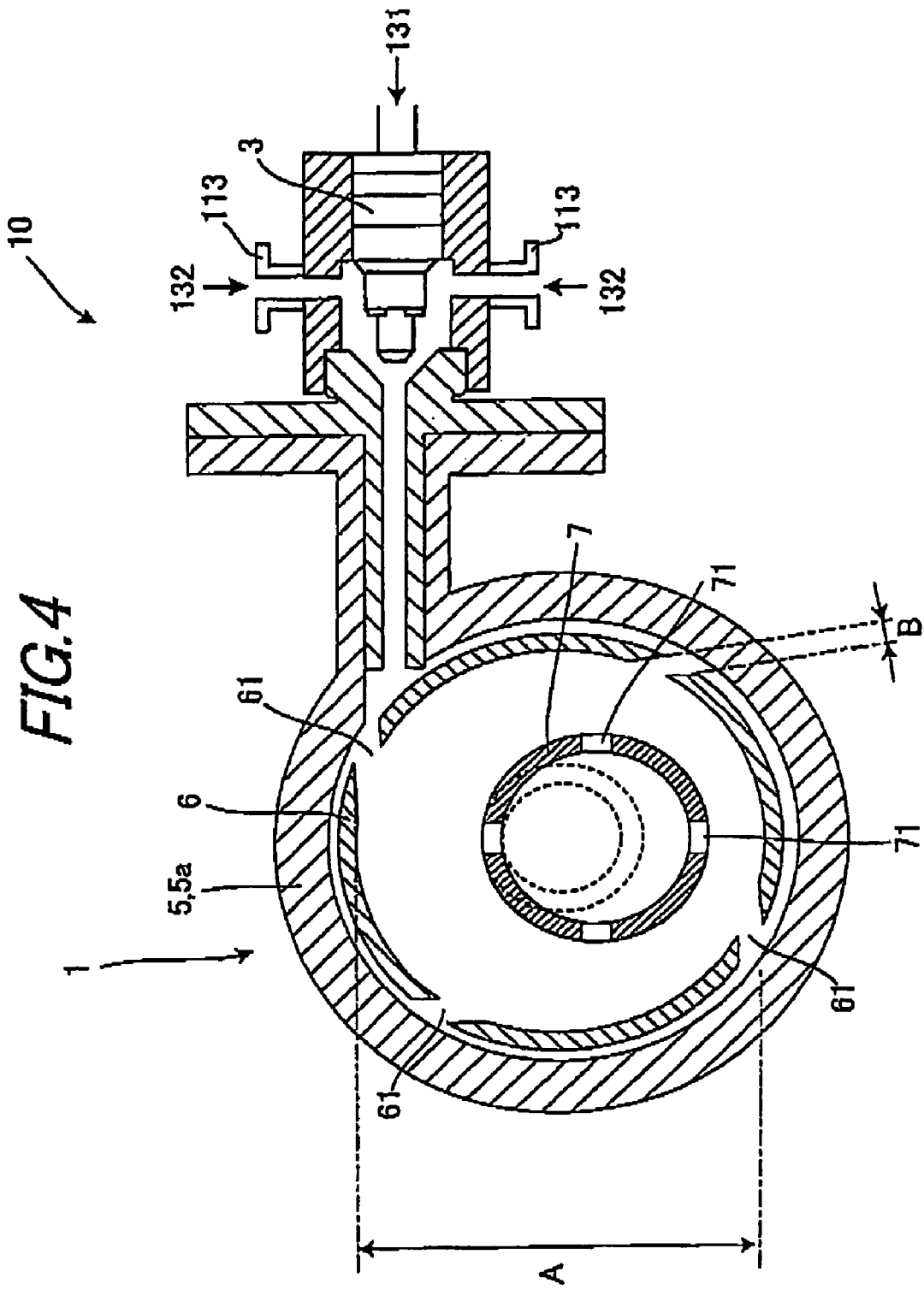
FIG. 4 is a cross-sectional view along a QQ cross-section of FIG. 2.
Figure 5:
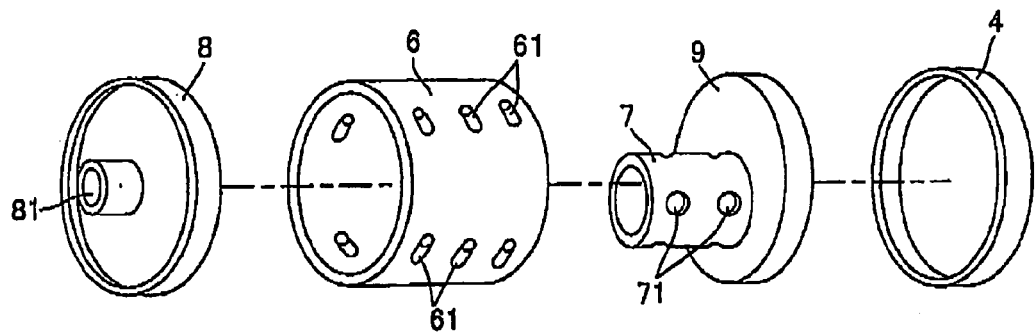
FIG. 5 is a perspective view of the PM generating apparatus shown in FIG. 1, in which parts are shown broken to illustrate the inside.
Figure 6:
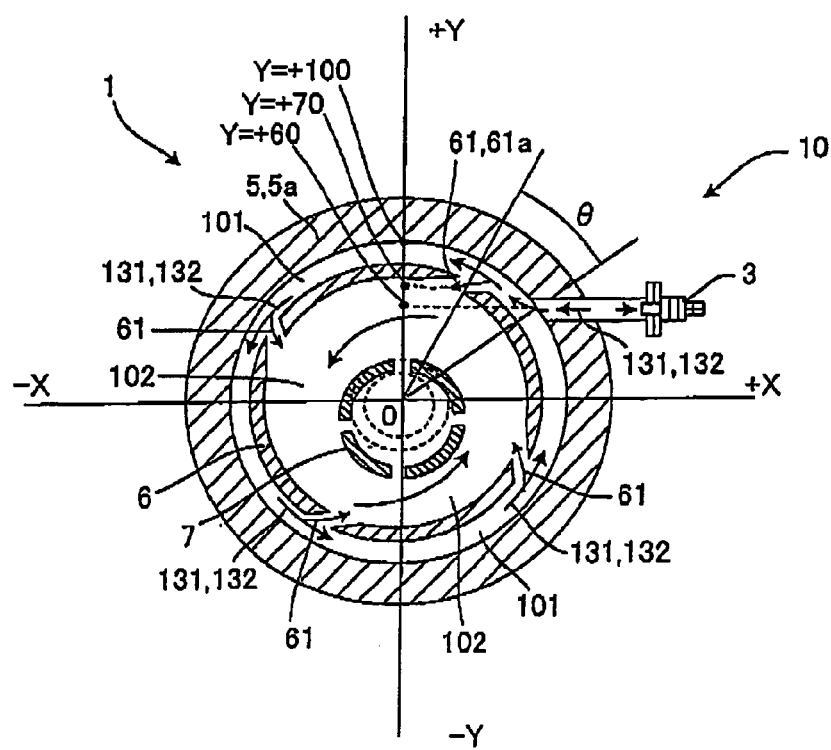
FIG. 6 is a drawing showing the same cross-section as FIG. 4, in which the chassis is shown expanded and the fuel-injection means is simplified.

First, the PM generating apparatus of the present invention will be described. FIGS. 1 to 6 show one embodiment of the PM generating apparatus of the present invention. FIG. 1 is a top view, FIG. 2 is a side elevation view, FIG. 3 shows a PP cross-section of FIG. 1, and FIG. 4 shows a QQ cross-section of FIG. 2. FIG. 5 is a broken perspective view of the inside of the apparatus, and FIG. 6 is a simplified view of a fuel injection means in which the chassis in FIG. 4 is shown expanded in order to explain the flow of fuel and combustion air.

The PM generating apparatus 10 shown in FIGS. 1 to 6 is equipped with a fuel-injection means 3 which injects a fuel 131 and a combustion chamber 1 in which the fuel is combusted. The PM generating apparatus 10 produces an air-fuel mixture with a high fuel concentration by continuously supplying combustion air 132 to the combustion chamber 1 from an air inlet 113 and injecting the fuel 131, preferably intermittently, to the combustion chamber 1 by the fuel-injection means 3. Since this air-fuel we with a high fuel concentration burns in the combustion chamber 1, in the outer side in which the air-fuel mixture comes into contact with the combustion air, the fuel (gas) of the inner side in which the air-fuel mixture does not come into contact with the combustion air is shut off from the combustion air and brought into a roast state by the heat of combustion, whereby PM is generated in exhaust gas. Specifically, the PM generating apparatus 10 is an apparatus which can produce a gas in which PM has been generated (a PM-containing gas 133).

The fuel injection means 3 of the PM generating apparatus 10 is provided on a chassis 5 in such a manner that the fuel 131 is injected therefrom (see FIG. 6) in the direction approximately at right-angles to the central axial direction of a cylindrical outer casing 6 (lateral direction in FIG. 5) and inclines to the direction tangential to the cross-section (a circular or round loop-like shape) perpendicular to the central axial direction of the outer casing 6 (see FIGS. 4 and 6). As the fuel-injection means 3, an electromagnetic injector which can intermittently inject fuel 131 into the space 101 between the chassis 5 and the outer casing 6, for example, can be used.

The combustion chamber 1 of the PM generating apparatus 10 has a chassis 5 which can be opened by being divided into two parts along a dividing plane 53, the outer casing 6 stored in a cylindrical area 5a of the chassis 5, an inner casing 7, and a ring 4 supporting the outer casing 6. The outer casing 6 has a shape of a cylinder and is incorporated in the cylindrical area 5a of the chassis 5 so that it may be coaxial therewith and the cylindrical inner casing 7 is incorporated in the outer casing 6 so that its axis has the same direction as and is eccentric with the central axis of the outer casing 6 (see FIGS. 3 and 4). In the combustion chamber 1 of the PM generating apparatus 10, the cylindrical outer casing 6 is connected with the air inlet 113 to which the combustion air is supplied, while the cylindrical inner casing 7 is not directly connected with the air inlet 113, but is connected with a flame entrance 51 which leads to a pilot burner 2 (see FIG. 3). The length of the outer casing 6, front plate 8, and back plate 9 in the direction of the central axis is equivalent to 98% of the length D (see FIG. 3) of the cylindrical area 5a of the inner side of the chassis 5 in the direction of the central axis. Specifically, the ratio of the length of the outer casing 6, front plate 8, and back plate 9 in the direction of the central axis to the length D of the cylindrical area 5a of the chassis 5 in the direction of the central axis is 98:100.

A flame entrance 51 leading to a pilot burner 2 and a gas outlet 52 discharging the gas in which the PM is generated are formed in the chassis 5. The front plate 8 is provided with an opening 81 leading to the gas outlet 52 and incorporated in the cylindrical area 5a of the chassis 5, forming the end on the gas outlet 52 side. The back plate part 9 is provided with an opening 91 leading to the flame entrance 51 and is incorporated in the cylindrical area 5a of the chassis 5, forming the end on the flame entrance 51 side. The diameter C of the gas outlet 52 is 25% of the internal diameter A of the outer casing 6 (see FIG. 3). Specifically, the ratio C:A of the diameter C of the gas outlet 52 to the internal diameter A of the outer casing 6 is 25:100. In the combustion chamber 1, although the front plate part 8 is not integrated with the outer casing 6, the back plate part 9 is integrated with the inner casing part 7. A gasket 301 is inserted between the ring 4 and the chassis 5 and a non-expandable ceramic fibrous mat (not shown) is inserted between the back plate part 9 and the chassis 5.

In the combustion chamber 1, the outer casing 6 is equipped with through-holes 61 around the circumference. The through-holes 61 are provided in a manner such that three layers are formed in the direction of the center axis (the lateral direction in FIG. 5) of the cylindrical outer casing 6, with each layer having four through-holes provided at equal intervals (so that the central angle is 90°) around the circumference of the cross-section perpendicular to the direction of the center axis of the outer casing 6. Specifically, the outer casing 6 is provided with twelve (3×4=12) through-holes 61 in total. The through-holes 61 of the outer casing 6 are formed inclined to the tangential direction (direction around the circumference of the outer casing) of the cross-section (a circular or round loop shape) perpendicular to the central axis direction of the outer casing 6 (see FIG. 4). As a result of through-holes' 61 inclination, elliptical openings are formed on the surface of the outer casing 6 (see FIG. 5). The diameter B of a through-hole 61 is 7% of the diameter A of the outer casing 6 (see FIG. 4). Specifically, the ratio B:A of the diameter B of the through-hole 61 to the internal diameter A of the outer casing 6 is 7:100. As shown in FIG. 4, the diameter B of a through-hole 61 is determined not by the elliptical opening on the surface of the outer casing 6, but as the diameter of a cross-section perpendicular to the center axis direction of the through-hole 61 itself.

On the other hand, the inner casing 7 is equipped with through-holes 71 around the circumference. The through-holes 71 are provided in a manner such that two layers are formed in the direction of the center axis (the lateral direction in FIG. 5) of the cylindrical inner casing 7, with each layer having four through-holes provided at equal intervals (so that the central angle is 90°) around the circumference of the cross-section perpendicular to the direction of the center axis of the inner casing 7. Specifically, the inner casing 7 is provided with eight (2×4=8) through-holes 71 in total. All the through-holes 71 of the inner casing 7 are not formed inclined, but are formed to the normal line direction (the direction from the circumference to the central axis) of the cross-section (a circular or round loop shape) perpendicular to the central axis direction of the inner casing 7 (see FIG. 4). As a result, round openings are formed on the surface of the inner casing 7 (see FIG. 5).

In the PM generating apparatus 10, the outer casing 6 is connected with the air inlet 113 to which the combustion air is supplied, while the cylindrical inner casing 7 does not directly connected with the air inlet 113, but is connected with a flame entrance 51 which leads to a pilot burner 2 (see FIG. 3). The fuel 131 injected into the space 101 between the chassis 5 and the outer casing 6 by the fuel-injection means 3 is vaporized and introduced into a space 102 between the outer casing 6 and the inner casing 7 via through-holes 61 of the outer casing 6, and is burnt in the space 102. In this instance, because the fuel-injection means 3 is installed in the chassis 5 so that the injection direction of fuel 131 inclines, as mentioned above, the fuel injected by the fuel-injection means 3 into the space 101 between the chassis 5 and the outer casing 6 runs around the circumference of the outer casing 6 and is introduced in the space 102 between the outer casing 6 and the inner casing 7 via the through-holes 61 of the outer casing 6 (see FIG. 6).

The combustion air 132 which is continuously supplied to the space 101 between the chassis 5 and the outer casing 6 from the air inlet 113 is introduced into the space 102 between the outer casing 6 and the inner casing 7 via the through-holes 61 of the outer casing 6 (see FIG. 6), while running around the circumference of the outer casing 6. The fuel 131 injected, preferably intermittently, into the space 101 between the chassis 5 and the outer casing 6 runs around the circumference of the outer casing 6 and is introduced into the space 102 between the outer casing 6 and the inner cylinder 7 via the through-holes 61 of the outer casing 6. The fuel then burns on the side (outer side) coming in contact with the combustion air 132, while the fuel (gas) on the side (inner side) not coming in contact with the combustion air 132 is shut off from the air and brought to a roast state by the heat of combustion, whereby PM is generated. The PM-containing gas 133 is then discharged from the gas outlet 52 and supplied to an exhaust gas purifying apparatus and the like. All parts of the PM generating apparatus 10 such as the outer casing 6, inner casing 7, front plate 8, and back plate 9 are formed from "Inconel" and all imperfect combustion generating PM occurs in the space surrounded by the "Inconel" material. The air inlet 113 is formed near the fuel-injection means 3 and has a structure convenient for miniaturizing the apparatus and improving maintenance of the apparatus.

In the PM generating apparatus 10, the outer casing 6, the inner casing 7, the front plate 8, and the back plate 9 can be all formed from a ceramic material (silicon nitride) in place of the "Inconel" material. In case that the outer casing 6, etc. are formed from a ceramic material, durability of the apparatus is improved. Further, since the ceramic material is difficult to thermally transform compared with the metallic material, a lowering of PM generation amount due to thermal transformation of the material is prevented.

Now, the positions of the fuel-injection means 3 and through-holes 61 and the direction in which the central axis of the inner casing 7 comes out of the central axis of the outer casing 6 in the PM generating apparatus 10 will be explained using the axes of coordinates shown in FIG. 6. The axes of coordinates in FIG. 6 consists of the X-axis and the Y-axis on the cross-section perpendicular to the central axial direction of the cylindrical area of the chassis 5, running through the central axis and mutually crossing at a right angle.

When the inner wall of the cylindrical area of the chassis 5 is located at Y=+100 on an axis of coordinates in the PM generating apparatus 10, the fuel-injection means 3 is installed at the location of Y=+60 in the chassis 5 so that the injection direction of a fuel is parallel to the X-axis. A through-hole 61a among several through-holes 61 of the outer casing 6 is located at Y=+70. The decentering of the outer casing 6 and the inner casing 7 mentioned above is caused by deflection of the central axis of the inner casing 7 from the central axis of the outer casing 6 to the −Y side. Specifically, on the axis of coordinates, the fuel-injection means 3 is provided on the +Y side and the outer casing 6 and the inner casing 7 deflect from each other on the opposite −Y side. In addition, in the PM generating apparatus 10, the angle θ formed by the through-hole 61a, which is one of the several through-holes 61 of the outer casing 6, the stab point O of the axes of coordinates, and the fuel-injection means 3 is 27°.

Figure 7:
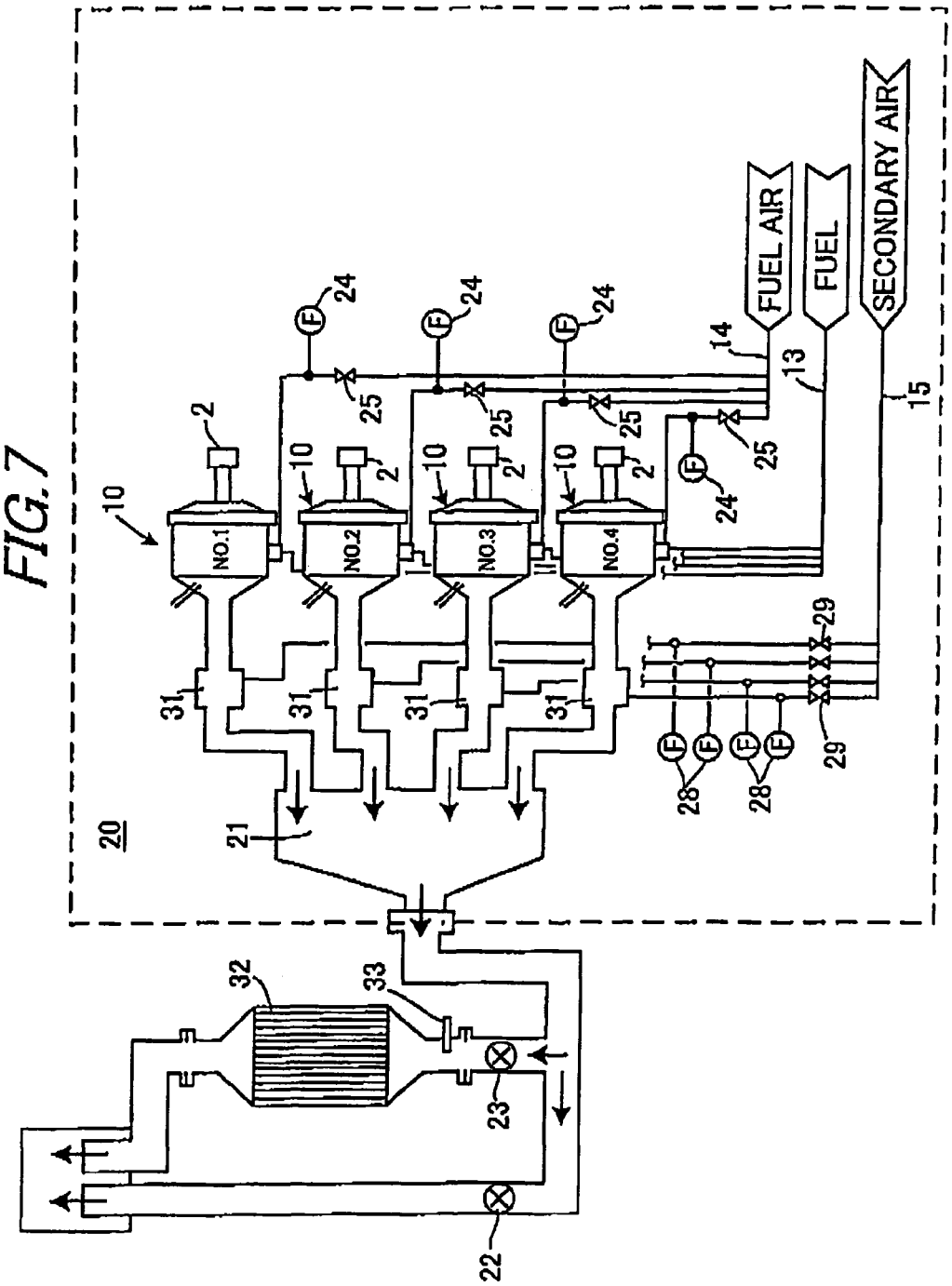
FIG. 7 is a diagram schematically showing one embodiment of the exhaust gas purring apparatus evaluation apparatus according to the present invention.

Next an apparatus for evaluating the exhaust gas purifying apparatus according to the present invention will be described. FIG. 7 is a diagram schematically showing one embodiment of the apparatus for evaluating the exhaust gas purifying apparatus (hereinafter referred to from time to time as "evaluation apparatus") according to the present invention. The evaluation apparatus 20 shown in FIG. 7 is equipped with four PM generating apparatuses 10 (No. 1, 2, 3, 4) of the above-mentioned type. PM-containing gas produced in these PM generating apparatuses are mixed by a PM-containing gas mixing means and the resulting mixed PM-containing gas is supplied to the exhaust gas purifying apparatus 32 to evaluate the exhaust gas purifying apparatus 32. The changeover valves 22 and 23 select whether or not a mixed PM-containing gas is supplied to the exhaust gas purifying apparatus 32. A temperature detector 33 made of, for example, thermocouples is provided in the downstream of the changeover valves 22 and 23 and detects the temperature of the resulting mixed PM-containing gas. Details of the PM generating apparatuses 10 such as an intermittent fuel injection means, a pilot burner 2, and the like are omitted and not shown in FIG. 7.

The PM-containing gas mixing means comprises a secondary air feed zone 31 which adjusts the temperature of the PM-containing gases produced by the PM generating apparatus 10 and a main header part 21 which collects and mixes PM-containing gases produced by the PM generating apparatuses No. 1, 2, 3, and 4. That is, in the evaluation apparatus 20, with which four PM generating apparatuses 10 are connected in parallel, the mixed PM-containing gas which finally joins and is mixed in the main header part 21 is supplied to an exhaust gas purifying apparatus 32. The number of PM-containing gas-mixing means provided in the apparatus for evaluating an exhaust gas purifying apparatus according to the present invention is not necessarily four, but the evaluation apparatus may be formed from any number of PM generating apparatuses with different specification which are connected in parallel.

Each PM generating apparatus 10 of the evaluation apparatus 20 is provided with a secondary air feed zone 31 on the outlet where PM-containing gas is sent out. In each secondary air feed zone 31, secondary air supplied by the secondary air supply means such as a compressor (not shown) via a flow channel 15 joins and is mixed with the PM-containing gas produced by each PM generating apparatus 10. The PM-containing gas of each PM generating apparatus 10 is adjusted to have a predetermined temperature and flow rate by controlling the flow rate of the secondary air. The flow rate of the secondary air is controlled by a flow meter 28 and a control valve 29. Specifically, the flow channel 15 of the secondary air sent to the secondary air feed zone 31 of each PM generating apparatus 10 is provided with a flow meter 28 and a control valve 29 for each system to control the flow rate of each secondary air. Although the control valve 29 may be of the type that can be manually adjusted independently from the flow meter 28, a type that can be automatically controlled based on the detected flow rate of the flow meter 28 is particularly preferred.

The evaluation apparatus 20 is equipped with a control means that can operate four PM generating apparatuses 10 under the same conditions or can operate each of the PM generating apparatuses 10 under conditions differing from the conditions applied to the other PM generating apparatuses 10. The control means comprises an intermittent fuel injection means (omitted from FIG. 7) having a function which controls time and cycle of opening and closing of the electromagnetic valves and a combustion air flow regulating means provided in the four PM generating apparatuses 10.

The combustion air flow regulating means regulates the flow rate of combustion air and comprises a flow meter 24 and a control valve 25. Specifically, each flow channel 14 of combustion air sent to the combustion chambers of the PM generating apparatuses 10 is provided with a flow meter 24 and a control valve 25 to control the flow rate of the combustion air of each combustion chamber. Although the control valve 25 may be of the type that can be manually adjusted independently from the flow meter 24, a type that can be automatically controlled based on the detected flow rate of the flow meter 24 is particularly preferred.

Using control equipment (not shown in FIG. 7) of the evaluation apparatus 20, the flow rate, temperature, PM content, properties of the contained PM, and the like of the resulting mixed PM-containing gas ultimately supplied to the exhaust gas purifying apparatus 32 can be freely altered by selecting the injection cycle of a fuel (opening-and-closing cycle of electromagnetic valve) and adjusting the flow rate of fuel by the fuel injection time using the intermittent fuel injection means in each of the four PM generating apparatuses 10, and further adjusting the flow rate of the above-mentioned secondary air.

In FIG. 7, an exhaust gas purifying apparatus 32 viewed from the side is shown. The exhaust gas purifying apparatus 32 of which the performance and/or durability are to be evaluated consists of a cylindrical space and two bowl-like spaces each gradually narrowing at the both ends. A filter to remove fine particles in the exhaust gas having a honeycomb structure or having a coating of an oxidation catalyst, for example, or a catalyst such as an oxidation catalyst or a three way catalyst to decompose toxic substances in exhaust gas having a honeycomb structure, for example, is packed in the cylindrical space. In addition, the exhaust gas purifying apparatus 32 is preferably equipped with an analyzer (not shown in Figures) to analyze CO, HC, $NO_x$, $SO_x$, and the like in gases on the down stream side (the outlet side of the exhaust gas).

EXAMPLES

The present invention is described more specifically by way of examples which are not intended to limit the present invention.

Example 1

A PM-containing gas was produced using the same PM generating apparatus 10 shown in FIG. 1, but equipped with a secondary air feed zone (see FIG. 7), in which gas oil used as a fuel was intermittently injected into combustion air by a fuel injection means to incompletely combust the fuel and produce PM, thereby producing the PM-containing gas. Secondary air sent from the secondary air feed zone was mixed with the resulting PM-containing gas to obtain a PM-containing gas at 200° C. to be evaluated (evaluation gas). The PM-containing gas (evaluation gas) was aspirated and the mass of the filter paper was measured to determine the amount of PM generated in one hour. The particle size distribution of PM was measured. Components of particulate matter in the PM-containing gas (evaluation gas) and gaseous components in the PM-containing gas (evaluation gas) were also analyzed.

[Method of measuring PM generation amount] The PM-containing gas (evaluation gas) was aspirated at a flow rate of 20 l/min and caused to pass through a filter paper (a low volume filter #8015-3 (AP2005500, 55 mm), a product of Millipore Corporation) for a prescribed period of time (one minute). The mass of PM adhering to the filter paper was measured using a micro balance ("ME5-F" manufactured by SARTORIUS K.K., 0.001 mg) and the amount of PM generated per one hour (g/Hr) and the amount of PM generated per 1 l of fuel consumed (g/l) were determined from the flow rate of PM-containing gas (evaluation gas) after mixing secondary air, the flow rate of gas aspirated thereafter, and aspiration time.

[Method of measuring particle size distribution of PM] The gas aspirated from the PM-containing gas (evaluation gas) after Bog with the secondary air is diluted to determine the PM particle size distribution using "Scanning Mobility Particle Sizer (SMPS)" Model 3936 series manufactured by TSI Inc.

[Analysis of components of particulate matter] PM components were analyzed using "Particulate Analyzer MEXA-1370PM" manufactured by Horiba, Ltd.

[Analysis of gas component] Gas components were analyzed using "MEXA-9100D" manufactured by Horiba, Ltd.

The particle size distribution of PM was 60 to $120 \times 10^{-9}$ m, approximately the same as that of the east gas from a diesel engine. The PM generation was 30.6 g/Hr, and the PM generation per 1 liter of consumed fuel was 11.7 g/l. The particulate matter in PM-containing gas consisted of 6.2 mass % of SOP, 93.6 mass % of soot, and 0.2 mass % of sulfate. Gas components were 40 ppm of CO, 50 ppm of HC, 12 ppm of $NO_x$, 14 vol % of $O_2$, and 5 vol % of $CO_2$.

Comparative Example 1

Figure 8:
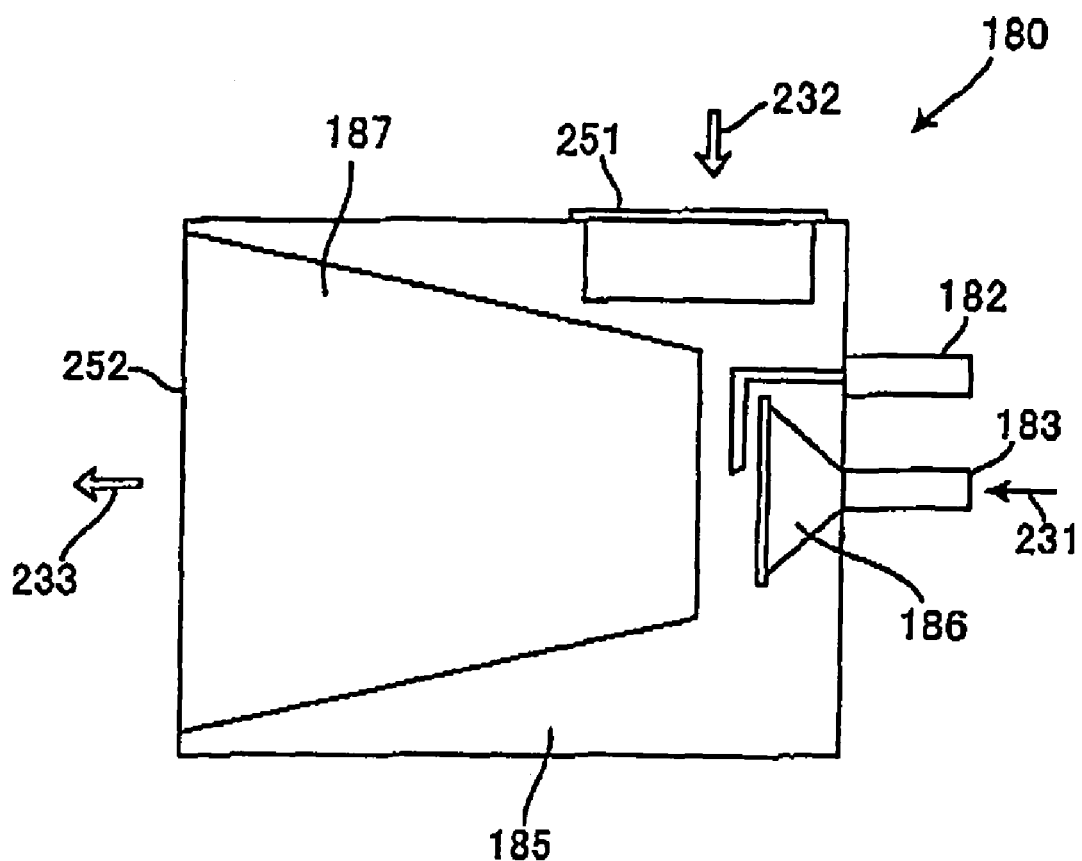
FIG. 8 is a cross-sectional view showing one embodiment of a conventional combustion apparatus.

A PM-containing gas was produced using a combustion apparatus 180 shown in FIG. 8, in which gas oil used as a fuel was intermittently injected into combustion air by a fuel injection means to be mixed with the combustion air to incompletely combust the fuel and produce PM, thereby producing the PM-containing gas. Secondary air sent using a compressor was mixed with the resulting PM-containing gas to obtain a PM-containing gas at 200° C. to be evaluated (evaluation gas). PM generated in one hour and particle size distribution of PM were measured, and components of particulate matter in the PM-containing gas (evaluation gas) and gaseous components in the PM-containing gas (evaluation gas) were also analyzed in the same manner as in Example 1.

The combustion apparatus 180 shown in FIG. 8 heats combustion air 232 introduced from an air inlet 251 for supplying combustion air in an air preheating chamber 185, mixes the heated combustion air 232 with a fuel 231 injected toward a combustion cylinder 187 by a baffle plate 186 from a fuel-injection means 183 in the air preheating chamber 185, ignites the air-fuel mixture by a combustor 182 to incompletely burn the mixture in the combustion cylinder 187, and discharges the PM-containing gas 233 from an gas outlet 252.

The particle size distribution of PM was 300 to $1,000\times10^{-9}$ m, significantly different from that of the exhaust gas from a diesel engine. The amount of PM generated was 5.2 g/HR (gas oil), and the PM generation per 1 liter of consumed fuel was 2.0 g/l. The particulate matter in PM-containing gas consisted of 30 mass % of SOF, 67 mass % of soot, and 3 mass % of sulfate. Gas components were 30 ppm of CO, 50 ppm of HC, 300 ppm of $NO_x$, 14 vol % of $O_2$, and 5 vol % of $CO_2$.

Consideration

The results of Example 1 confirmed that the particle size distribution of PM produced by the PM generating apparatus of the present invention was 60 to $120\times10^{-9}$ m, which is approximately the same as that of the exhaust gas from a diesel engine. In addition, it was confirmed that PM with constant properties can be produced without increasing SOF even if the amount of PM produced is increased. As can be seen from the results of the particle size distribution of 300 to $1,000\times10^{-9}$ m of Comparative Example 1, the particle size distribution is broad in the case of conventional combustion equipment in which a fuel is not sufficiently vaporized. In addition, PM with constant properties could not be produced due to an increase of SOF in spite of the smaller amount of PM production. Although the color of the PM was black in Example 1, the color was gray in the Comparative Example 1. This is considered to be the result of the SOF content.

The PM generating apparatus and the exhaust gas purifying apparatus evaluation apparatus of the present invention can be suitably used for evaluating performance and/or durability of an exhaust gas purifying apparatus equipped with a filter to remove fine particles from exhaust gas, a catalyst for oxidizing, combusting, and removing fine particles deposited on the filter, or a catalyst which decomposes toxic substances in the exhaust gas, and the like.

What is claimed is:

1. An apparatus for generating PM (particulate matter) in a gas by mixing a liquid and/or gaseous fuel with combustion air and incompletely burning the mixture, comprising:
    a combustion chamber in which fuels are mixed with combustion air and combusted,
    a fuel-injection means to inject the fuel to the combustion chamber, and
    a pilot burner which ignites the air-fuel mixture;
    the combustion chamber comprising a chassis equipped with an air inlet for supplying combustion air, a gas outlet for discharging the gas in which PM was generated, and a flame entrance leading to the pilot burner, an outer casing incorporated in the chassis, while forming a space between itself and the chassis, and an inner casing incorporated in the outer casing so as to be directly connected to the flame entrance, while forming a space between itself and the outer casing;
    the outer casing and inner casing being provided with through-holes around the circumference thereof so that the fuel injected by the fuel-injection means into the space between the chassis and the outer casing and the combustion air supplied to the space between the chassis and the outer casing from the air inlet are introduced into the space between the outer casing and the inner casing through the through-holes of the outer casing and mixed there.

2. The PM generating apparatus according to claim 1, wherein the fuel-injection means is a means capable of intermittently injecting the fuel into the space between the chassis and the outer casing.

3. The PM generating apparatus according to claim 1, wherein the chassis has a cylindrical area and each of the outer casing and the inner casing has a shape of a cylinder, the cylindrical outer casing being incorporated in the cylindrical area of the chassis so that the cylindrical outer casing becomes coaxial with the cylindrical area of the chassis, and the cylindrical inner casing being incorporated in the cylindrical outer casing so that its axis has the same direction as, but is eccentric to the central axis direction of the cylindrical outer casing.

4. The PM generating apparatus according to claim 3, wherein the PM generating apparatus is provided with a front plate which is incorporated in the chassis, is equipped with an opening leading to the gas outlet, and forms the end face on the gas outlet side, and a back plate which is incorporated in the chassis, is equipped with an opening leading to the flame entrance, and forms the end face of the flame entrance side.

5. The PM generating apparatus according to claim 4, wherein the front plate and the outer casing are integrated and/or the back plate and the inner casing are integrated.

6. The PM generating apparatus according to claim 4, wherein the outer casing, the inner casing, the front plate, and the back plate are formed from a metallic material.

7. The PM generating apparatus according to claim 4, wherein the outer casing, the inner casing, the front plate, and the back plate are formed from a ceramic material.

8. The PM generating apparatus according to claim 7, wherein the ceramic material is at least one kind selected from the group consisting of silicon nitride, silicon carbide, zirconia, zirconium phosphate, aluminium titanate, titania, and combination thereof.

9. The PM generating apparatus according to claim 3, wherein the fuel-injection means is installed in the chassis so that fuel injection direction is approximately right-angled to the central axis direction of the outer casing and inclines to the tangential direction of the cross-section perpendicular to the central axis direction of the outer casing, and the fuel injected by the fuel-injection means in the space between the chassis and the outer casing is introduced to the space between the outer casing and the inner casing through through-holes of the outer casing, while running around the circumference of the outer casing.

10. The PM generating apparatus according to claim 3, wherein the air inlet is provided near the fuel-injection means of the chassis and the combustion air supplied to the space between the chassis and the outer casing from the air inlet is introduced along with the fuel into the space between the outer casing and the inner casing through the through-holes of the outer casing, while running the circumference of the outer casing.

11. The PM generating apparatus according to claim 3, wherein a part or all of the through-holes provided in the outer casing are formed inclined to the tangential direction of the cross-section perpendicular to the central axis direction of the outer casing.

12. The PM generating apparatus according to claim 3, wherein, in the case in which axes of coordinates consisting of an X-axis and a Y-axis crossing at the central axis of the cylindrical area of the chassis at right angles to each other are set on a cross-section perpendicular to the central axis direction of the cylindrical area of the chassis (provided that the absolute direction of the X-axis and Y-axis are not limited so long as the X-axis and Y-axis mutually maintain a right angle on a cross-section perpendicular to the central axis direction), the PM generating apparatus provided with the fuel-injection means in the chassis in such a manner that the fuel injection direction is parallel to the X-axis at a position of Y=+60 to +80, when the wall of the cylindrical area of the chassis is located at Y=+100.

13. The PM generating apparatus according to claim 12, wherein at least one through-hole among the two or more through-holes provided around circumference of the outer casing is located at Y=+70 to 90.

14. The PM generating apparatus according to claim 12, wherein the outer casing and the inner casing are eccentrically located by deflection of the central axis of the inner casing to the −Y side from the central axis of the outer casing.

15. The PM generating apparatus according to claim 4, wherein the ratio of the total length of the outer casing, front plate, and back plate in the central axis direction to the inside length of the cylindrical area of the chassis in the central axis direction is 70:100 to 98:100.

16. The PM generating apparatus according to claim 4, wherein a non-expandable ceramic fibrous mat is inserted between the back plate and the chassis.

17. The PM generating apparatus according to claim 3, wherein the ratio of the diameter of the through-holes arranged around the circumference of the outer casing to the inner diameter of the outer casing is 5:100 to 20:100.

18. The PM generating apparatus according to claim 3, wherein the ratio of the diameter of the gas outlet in which PM is generated formed in the chassis to the inner diameter of the outer casing is 10:100 to 50:100.

19. The PM generating apparatus according to claim 1, wherein the volume (liter) inside the outer casing of the combustion chamber is 1.2 times or more of the flow rate ($Nm^3$/min) of the maximum amount of the combustion air supplied.

20. The PM generating apparatus according to claim 1, wherein the inner diameter (mm) of the outer casing of the combustion chamber satisfies the conditions that the quotient obtained by dividing a square of the inner diameter (mm) of the outer casing by the maximum flow rate ($Nm^3$/min) of the combustion air supplied is $2.0 \times 10^4$ or more.

21. The PM generating apparatus according to claim 1, wherein the fuel injection pressure is 0.1 to 1.0 (MPa).

22. The PM generating apparatus according to claim 1, wherein when the fuel is gas oil, the amount of PM generated in the gas is 0.1 to 30 g/l (gas oil).

23. The PM generating apparatus according to claim 1, wherein the amount of SOF (soluble organic fraction: components soluble in organic solvent) of the PM to be generated in a gas is 1 to 50 mass %, and the average particle diameter of the PM is 10 to $150 \times 10^{-9}$ m.

24. The PM generating apparatus according to claim 1, equipped with two or more combustion chambers, fuel-injection means, and pilot burners.

25. The PM generating apparatus according to claim 1, wherein the destination to which the gas in which PM is generated is sent is an exhaust gas purifying apparatus and the PM generating apparatus is used for evaluating the exhaust gas purifying apparatus.

26. The PM generating apparatus according to claim 25, wherein the exhaust gas purifying apparatus is equipped with a DPF (diesel particulate filter) and the target of evaluation is one or more of the collection efficiency, PM deposition pressure loss, reproduction performance, and oxidation performance of the DPF.

27. An apparatus for evaluating an exhaust gas purifying apparatus by supplying a mixed PM-containing gas to the exhaust gas purifying apparatus, comprising:
two or more PM generating apparatuses according to claim 1,
a controlling means which can operate the two or more PM generating apparatuses under the same conditions or at least one PM generating apparatus under the conditions differing from the conditions under which the other PM generating apparatuses are operated, and
a PM-containing gas-mixing means to mix gases in which PM produced in different PM generating apparatuses was generated to obtain the mixed PM-containing gas.

28. An apparatus for generating PM (particulate matter) in a gas by mixing a liquid and/or gaseous fuel with combustion air and incompletely burning the mixture, comprising:
a combustion chamber in which fuels are mixed with combustion air and combusted,
a fuel-injection means to inject the fuel to the combustion chamber, and
a pilot burner which ignites the air-fuel mixture;
the combustion chamber comprising a chassis equipped with an air inlet for supplying combustion air, a gas outlet for discharging the gas in which PM was generated, and a flame entrance leading to the pilot burner, an outer casing incorporated in the chassis, while forming a space between itself and the chassis, and an inner casing incorporated in the outer casing so as to be directly connected to the flame entrance, while forming a space between itself and the outer casing;
the outer casing and inner casing being provided with through-holes around the circumference thereof so that the fuel injected by the fuel-injection means into the space between the chassis and the outer casing and the combustion air supplied to the space between the chassis and the outer casing from the air inlet are introduced into the space between the outer casing and the inner casing through the through-holes of the outer casing and mixed there,
wherein the chassis has a cylindrical area and each of the outer casing and the inner casing has a shape of a cylinder, the cylindrical outer casing being incorporated in the cylindrical area of the chassis so that the cylindrical outer casing becomes coaxial with the cylindrical area of the chassis, and the cylindrical inner casing being incorporated in the cylindrical outer casing so that its axis has the same direction as, but is eccentric to the central axis direction of the cylindrical outer casing,
wherein, in the case in which axes of coordinates consisting of an X-axis and a Y-axis crossing at the central axis of the cylindrical area of the chassis at right angles to each other are set on a cross-section perpendicular to the central axis direction of the cylindrical area of the chassis (provided that the absolute direction of the X-axis and Y-axis are not limited so long as the X-axis and Y-axis mutually maintain a right angle on a cross-section perpendicular to the central axis direction), the PM generating apparatus provided with the fuel-injection means in the chassis in such a manner that the fuel injection direction is parallel to the X-axis at a position of Y=+60 to +80, when the wall of the cylindrical area of the chassis is located at Y=+100, and
wherein the angle formed by at least one of the two or more through-holes provided around the circumference of the outer casing, the origin of the axes of coordinates, and the fuel-injection means is 10 to 40°.

* * * * *